Figure 1:
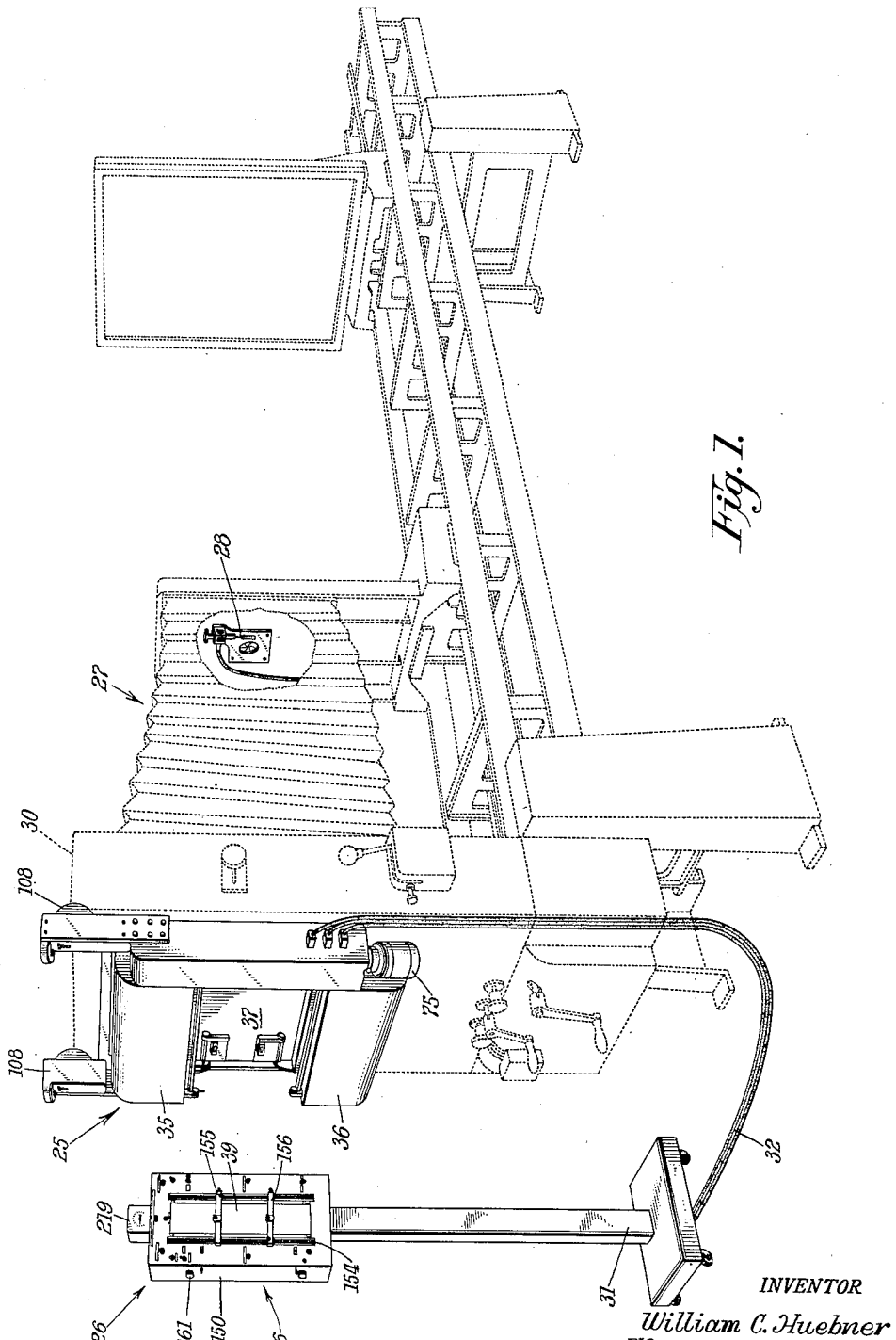

Nov. 6, 1951     W. C. HUEBNER     2,574,392
ROLL FILM CAMERA ATTACHMENT

Filed Aug. 20, 1948     7 Sheets-Sheet 1

INVENTOR
William C. Huebner
BY
AGENT

Nov. 6, 1951  W. C. HUEBNER  2,574,392
ROLL FILM CAMERA ATTACHMENT
Filed Aug. 20, 1948  7 Sheets-Sheet 3

INVENTOR.
William C. Huebner
BY
AGENT

Nov. 6, 1951 — W. C. HUEBNER — 2,574,392
ROLL FILM CAMERA ATTACHMENT
Filed Aug. 20, 1948 — 7 Sheets-Sheet 4

INVENTOR.
William C. Huebner
BY
AGENT

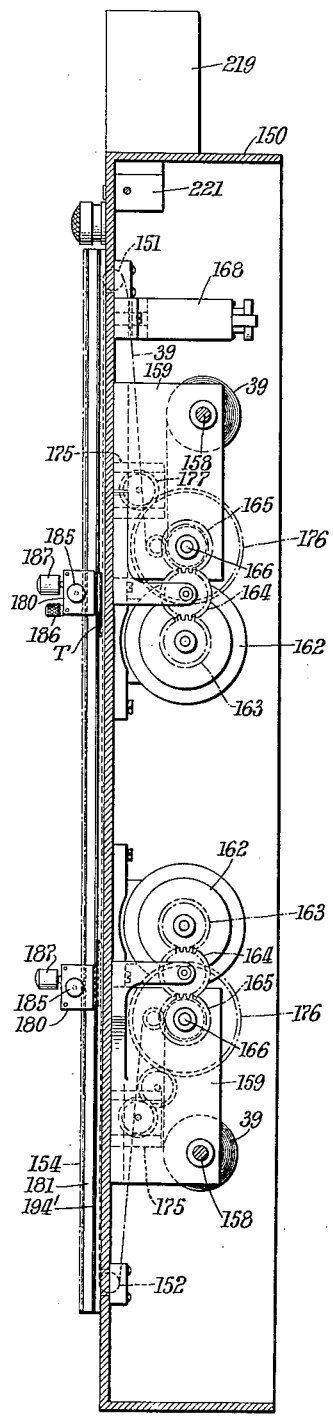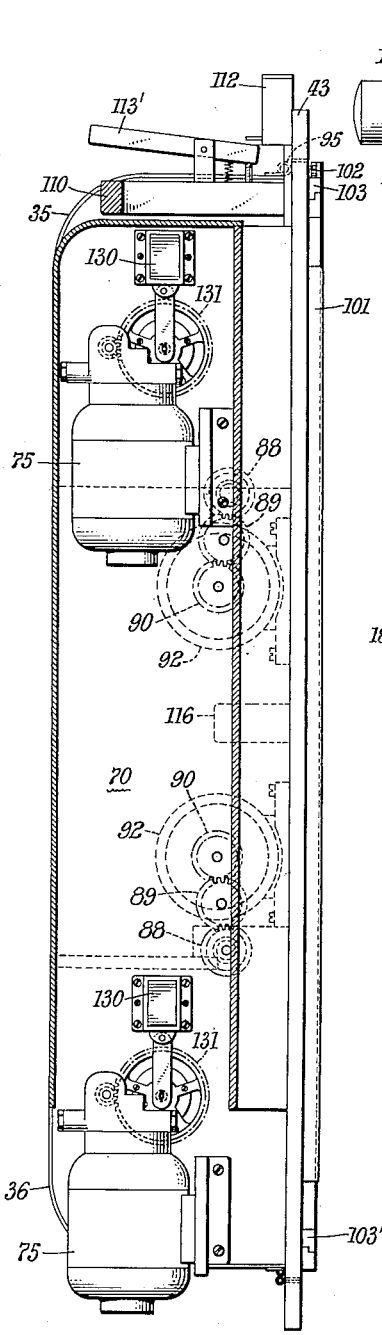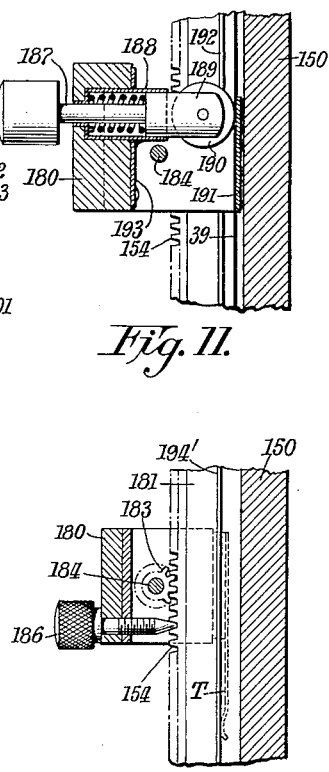
Fig. 10. Fig. 6. Fig. 11. Fig. 12.
INVENTOR
William C. Huebner
BY
AGENT Nov. 6, 1951 — W. C. HUEBNER — 2,574,392
ROLL FILM CAMERA ATTACHMENT
Filed Aug. 20, 1948 — 7 Sheets-Sheet 6
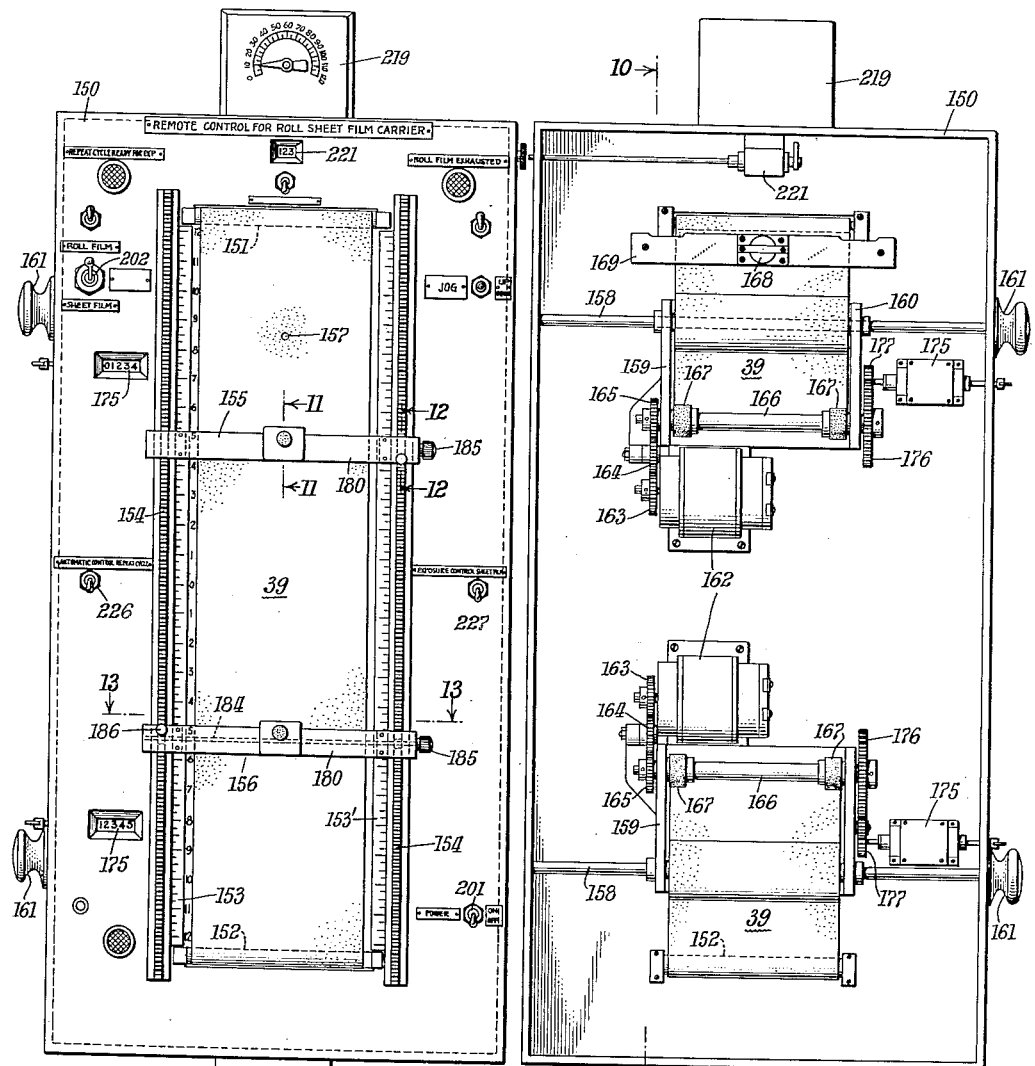
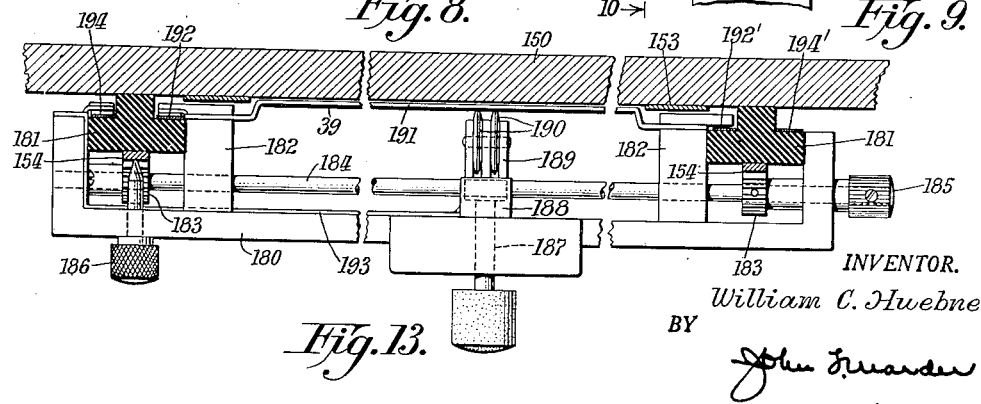
Fig. 8.   Fig. 9.   Fig. 13.
INVENTOR.
William C. Huebner
BY
AGENT

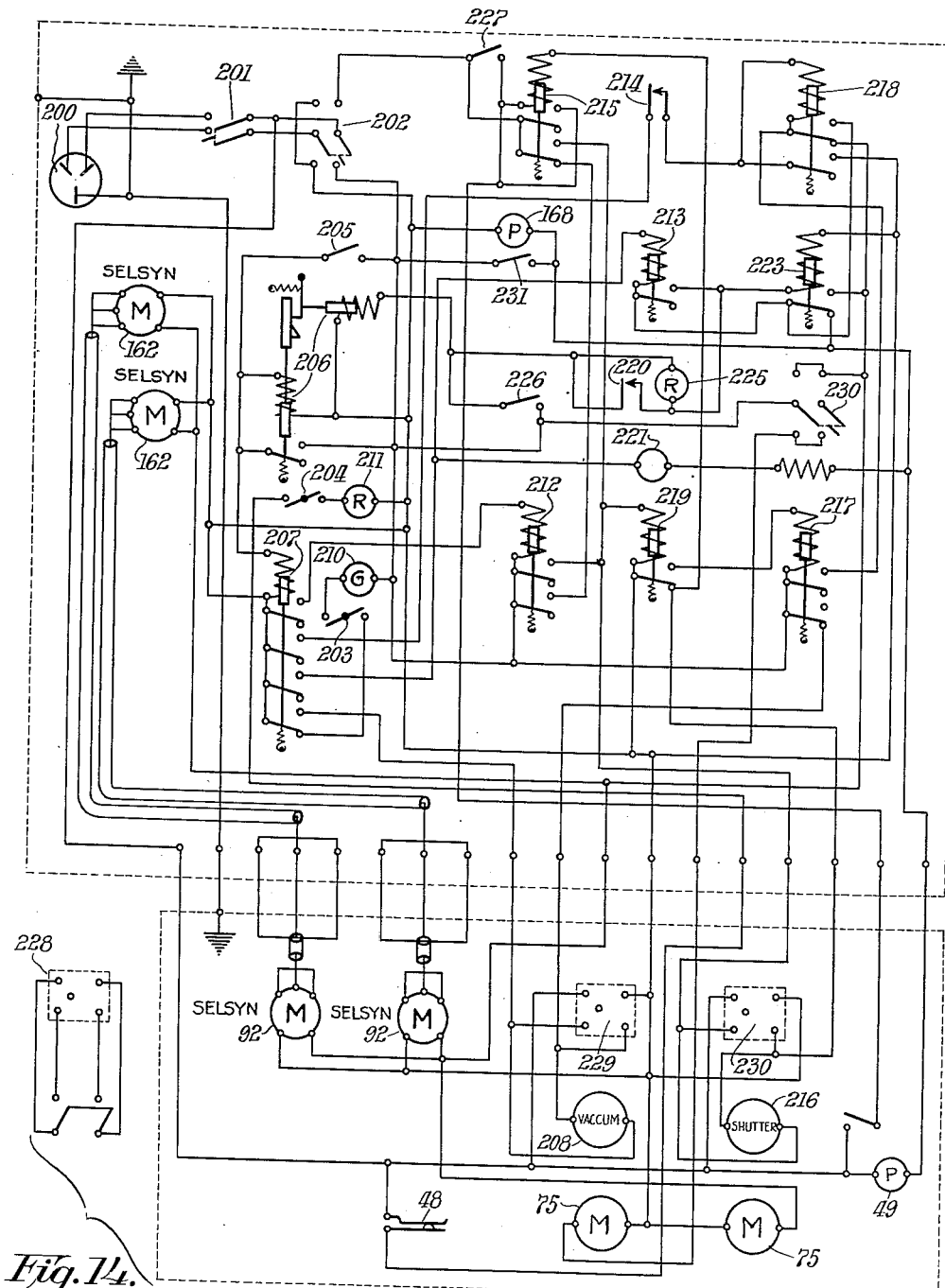

Patented Nov. 6, 1951

2,574,392

UNITED STATES PATENT OFFICE 2,574,392

ROLL FILM CAMERA ATTACHMENT

William C. Huebner, New York, N. Y.

Application August 20, 1948, Serial No. 45,294

13 Claims. (Cl. 88—24)

This invention relates to improvements in photographic cameras. In particular, the invention is directed to an improved film magazine for copying cameras of the type used in the graphic arts for the preparation of printing plates or other printing surfaces.

Copying cameras for printing are large horizontal or vertical structures having provision for accurately holding and positioning flat copy with respect to a camera lens and with respect to a film supporting surface of a fixed camera back-section. Lenses are adjustable for focusing, and extraneous light is prevented from entering the camera between the adjustable lens and the fixed camera back by the use of a bellows or other telescopic lighttight enclosure. If halftone work is being processed with the camera, a halftone screen is adjustably inserted in the camera back-section in front of the film. Unexposed film may be held in place on the film supporting surface by the use of a suitable adhesive tape or with a vacuum film holder or other suitable expedients well known by those who are experienced in this art. The camera back, on large camera installations, is frequently built into a dark room or enclosure so that the camera may be manipulated without danger of unwanted exposure to light.

The film used on large copying cameras is largely handled in sheet form rather than in roll form by reason of the variable size requirements of the work, and such practice including sheet film preparation and the operations associated with the exposure of copy on sheet film are costly and slow. To overcome the disadvantages of sheet film operation, roll film attachments have been built for or added to copying cameras, but as a rule they are not sufficiently versatile and saving of time and material to warrant a broad field of utility in photographic reproduction processes. The particular field of utility for present commercial roll sheet copying cameras is therefore limited to such specialized work as may be carried out with the facilities of these known devices.

It is the principal object of the present invention to provide a roll film attachment for copying cameras having a wide field of utility in the art of photographic reproduction for printing.

It is a further objects of this invention to provide a roll film attachment for copying cameras which will enhance the production of copy work with greater precision and speed of operation than is presently available in known devices of this kind.

A further object of the invention is to provide a roll film camera back having a remotely operable control incorporating features by which the operator of the camera may at all times see, in duplicate, the traverse of film within the camera.

A still further object of my invention is to provide a copying camera in which the movement of film in the camera may be controlled by apparatus which is remote from the camera but which may be adjusted for variations in the spacing of the film for exposures.

Another object of my invention is to provide a remote control for a copying camera back having a roll film attachment whereby the operator is not required to manipulate any levers or any other components mechanically connected to the camera during the interval from the time a roll film is started until it has been completely and selectively exposed.

Another object of my invention is to provide a roll film fed attachment with a remote control from which individual cut sheets of film may be removed by direct manipulation if the work being processed so requires.

Other objects of the invention will become apparent during a consideration of the following description of a physical embodiment of the invention which is similar in some respects to the film carrier of my co-pending application, Serial Number 741,035, now Patent No. 2,504,527, of April 18, 1950. It is to be understood that the camera apparatus and the auxiliaries described are of preferred construction and that various changes may be made in the size and shape and arrangement of parts as well as in the materials from which they are constructed without departing from the invention as particularly pointed out in the appended claims.

Figure 2:
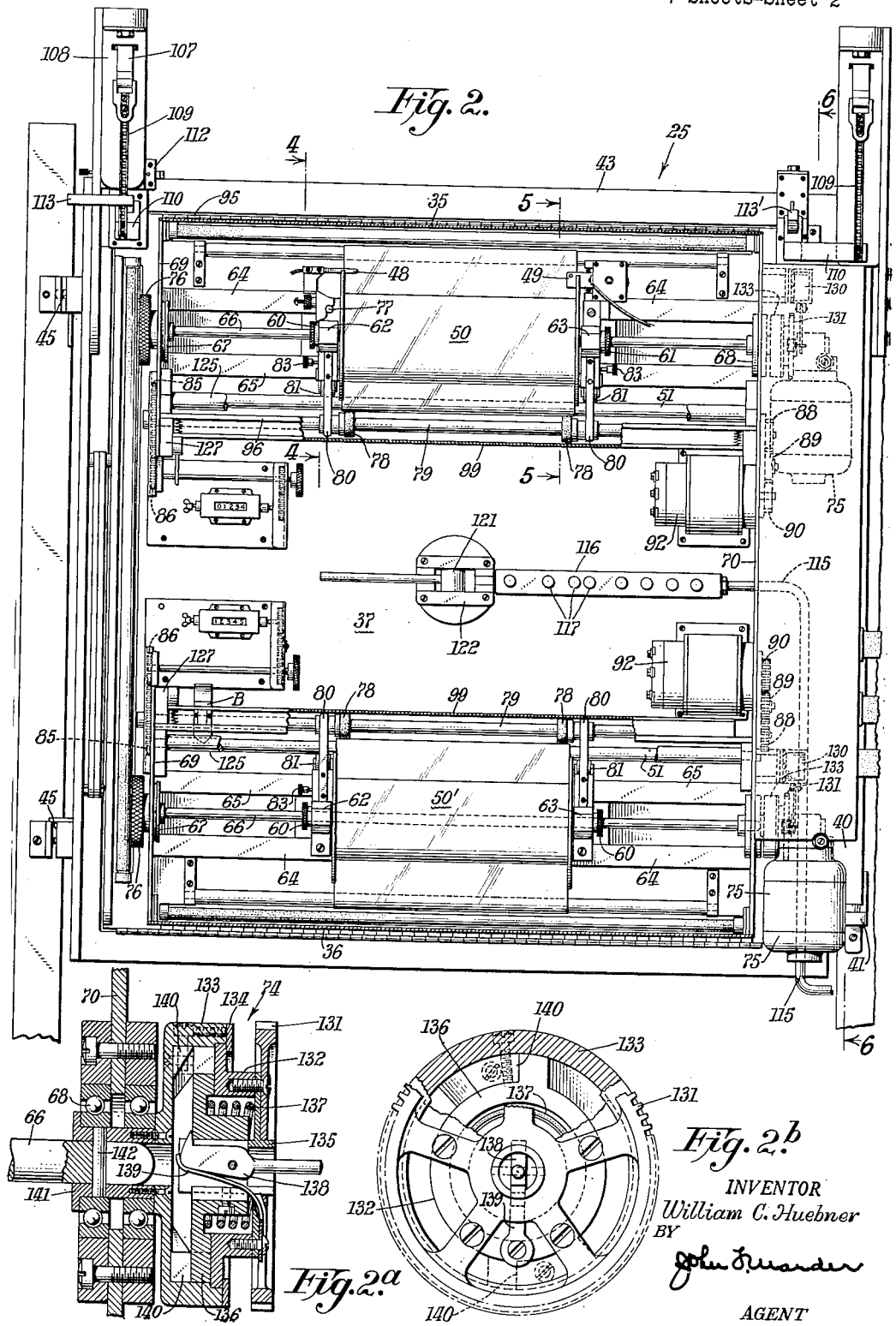
Figure 3:
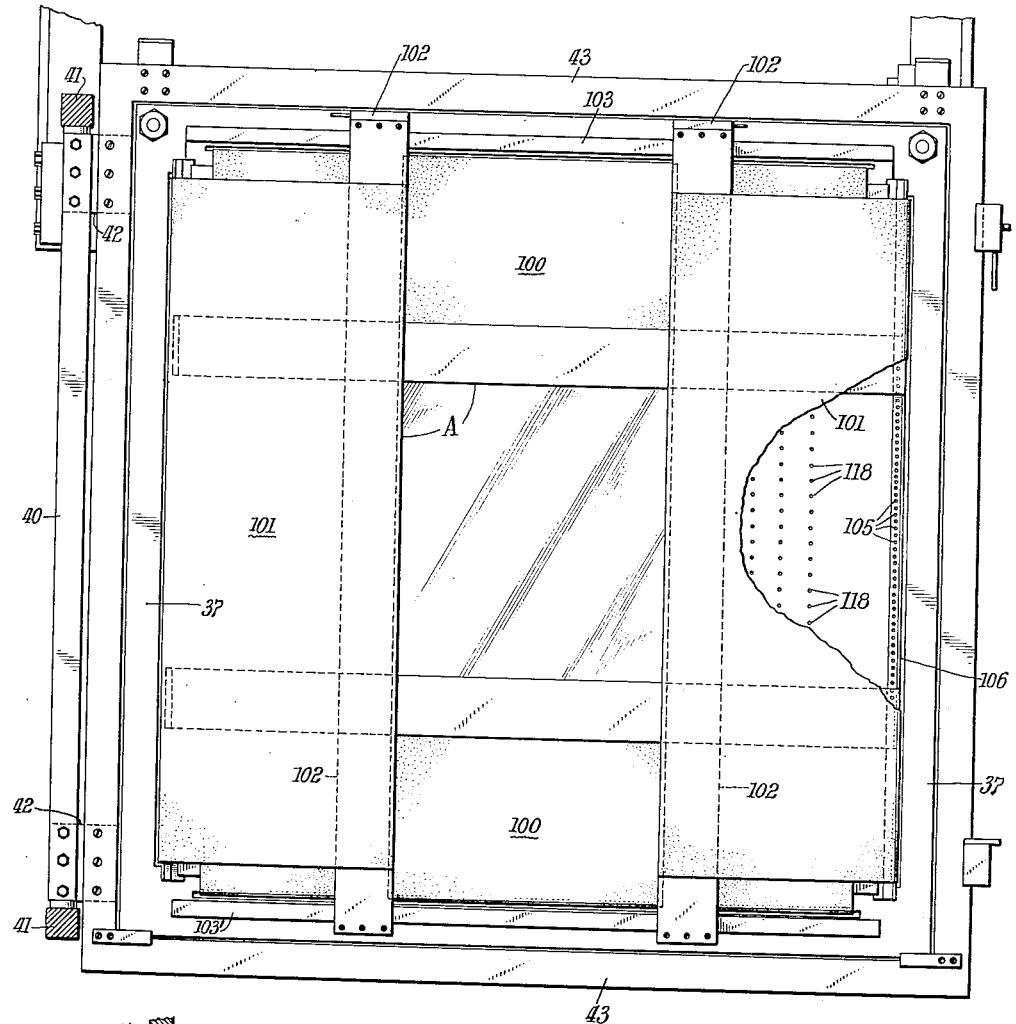
Figure 5:
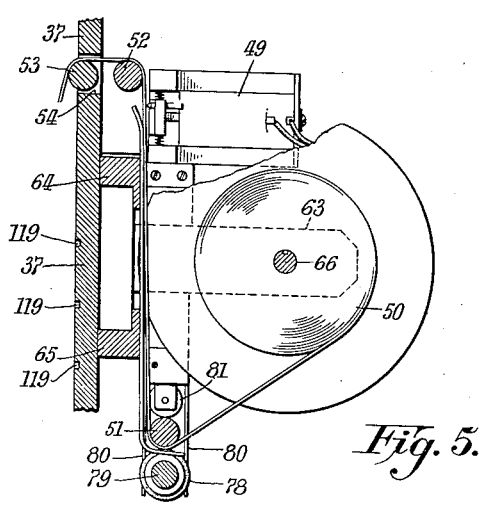
Figure 7:
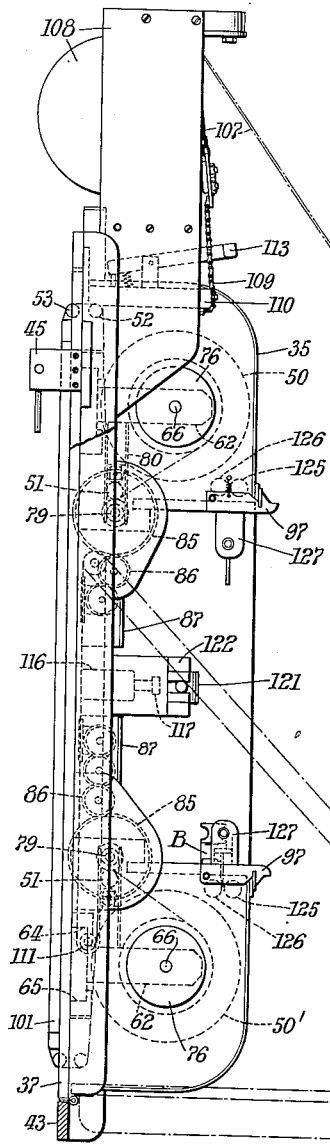
Figure 4:
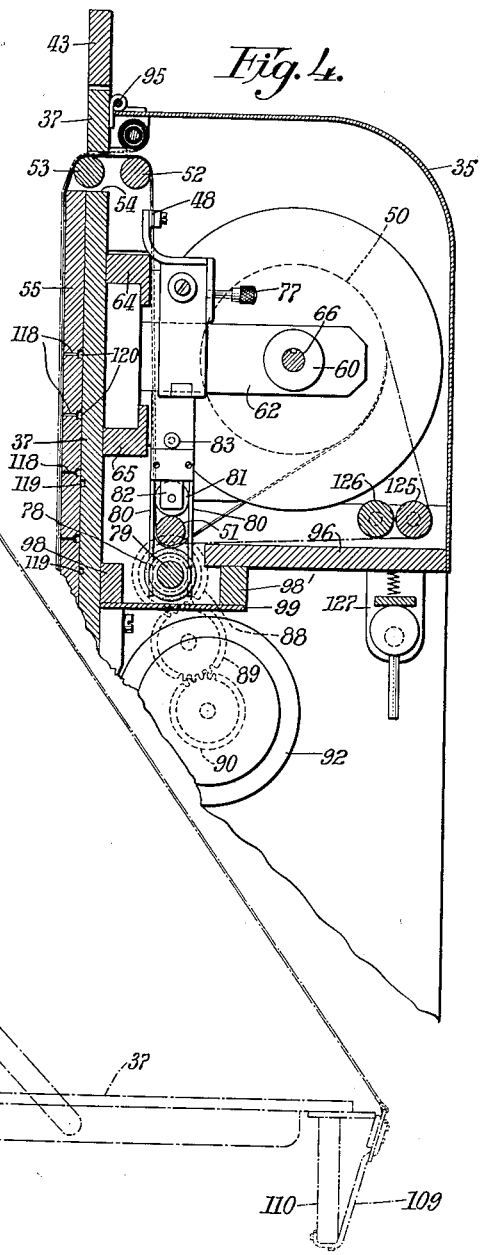

In the drawings,

Figure 1 is a perspective view illustrating a copying camera incorporating the principles of my invention with a remote control apparatus in the background, Figure 2 is an elevation view of the roll film camera attachment of my invention taken from the rear of the camera and with cover parts removed for clarity, Figure 2a is a cross-section view of a film roll driving clutch adapted for use with my invention, Figure 2b is a face view of the clutch of Figure 2a partly cut away to illustrate details of construction, Figure 3 is a face view of the roll film attachment taken from the opposite side from that of Figure 2, with the attachment hinged away, to show the film holding surface thereof, Figure 4 is a fragmentary view of the roll film driving mechanisms partly in cross-section taken on lines 4—4 of Figure 2, Figure 5 is a vertical cross-section view of a portion of the roll film mechanisms taken on lines 5—5 of Figure 2, Figure 6 is a right hand side elevation view of the roll film attachment with the end covers cut away taken vertically on lines 6—6 of Figure 2, Figure 7 is a left side elevation view of the roll film attachment showing, in phantom, how the attachment pivots down from the camera back, Figure 8 is a front face view of the remote control apparatus employed with my invention, Figure 9 is a rear face view of remote control apparatus with certain electrical switching and control parts omitted for clarity, Figure 10 is a vertical cross-section view through the tape driving mechanism of the remote control apparatus taken on lines 10—10 of Figure 9, Figure 11 is a vertical cross-section view taken on lines 11—11 of Figure 8, Figure 12 is a vertical cross-section view taken on lines 12—12 of Figure 8, Figure 13 is a cross-section view taken horizontally through a part of the remote control apparatus on lines 13—13 in Figure 8, and Figure 14 is a wiring diagram for the remote control and the vacuum back apparatus.

Referring to the drawings, Figure 1 illustrates several main component units in their assembled relationship, wherein are incorporated the principles and features of my invention, including a roll film vacuum back apparatus generally indicated at 25 and a remote control apparatus 26, the vacuum back being mounted on the rear end of a copying camera 27, outlined in broken lines, fitted with a suitable electrically actuated lens and shutter assembly 28. Details of construction of copying cameras of this kind are well known in the graphic arts and need not be elaborated upon here for a complete understanding of the invention by those who are skilled in the art of photographic preparation for printing. Vacuum back apparatus 25 is hinged to the frame structure of the camera section 30 and remote control apparatus 26 is situated apart from the camera at an operating location, preferably outside of the dark room, elevated to a manipulating level on a rolling pedestal 31. Flexible electrical wiring 32 interconnects the roll film vacuum back apparatus 25 with remote control apparatus 26, the details of which will be understood during a consideration of the following specifications.

An upper portion of the roll film vacuum back apparatus 25 is supplied with a horizontally hinged cover 35 and contains a roll of film as, for example an unexposed roll, together with certain guiding and driving devices; and a lower portion having a similar hinged cover 36 accommodates a roll of exposed film with its guiding and driving mechanisms. The aforementioned roll film devices are affixed to a supporting plate 37 which also forms a part of a vacuum film holder, along the back of which the film travels as a web in contact with the vacuum holder surface so that its emulsion surface is directly in the path of an image conducted thereto from the camera lens. The film web, as will be later understood, travels intermittently from the supply roll to the rewind roll according to prescribed control settings and, corresponding to the movement of film, a visible tape 39 travels across the front face of the remote control apparatus 26, tape 39 being likewise trained from a suitable supply roll to rewind roll located in the upper and lower portions of the remote control housing. Vacuum supply is directed to the apparatus from a suitable motor-pump unit, not shown.

Figures 2 and 3 show the roll film vacuum back apparatus 25 on an enlarged scale with covers 35 and 36 for the upper and lower roll film housings cut away in Figure 2, which will now be considered for an understanding of details of construction of the roll film mechanisms. Reference is also made at this point to the fragmentary views of Figures 4, 5, and 6 which further illustrate details of the assembly of Figure 2 relating to the roll film mechanisms. Assembly 25 is hinged to the camera by the use of a square, vertical, hinge bar 40 pivotably mounted in L-shaped hinge brackets 41 secured to the camera, and suitable rectangular mounting plates 42 are employed to join the hinge bar at the top and bottom with the square outlining vacuum back retainer frame 43, to which the vacuum back parts are assembled. When in closed or operating position, as shown in Figure 2, the camera back 25 is held in place by means of a pair of suitable spring catches 45 which maintain the assembly squarely and firmly in position directly behind the usual opening in the back section of the camera.

The unexposed supply roll of film 50 is loaded in the upper portion of the apparatus and the web of film leading from the roll, see Figure 4, is threaded downwardly and to the left under an elongated lower guide roller 51 and thence vertically upwardly over a pair of upper guide rollers 52, 53 and through a horizontal aperture 54 in mounting plate 37. Before reaching roller 52 the left and right hand edges of the web respectively contact an exhausted film trip switch 48 and a film-nicking punch 49, which will be further referred to at a later point in the specification. From roller 53, the film web runs vertically downwardly along the vacuum distribution platen member 55 which abuts the supporting plate 37, and upon reaching the lower exposed roll film mechanisms, the web traverses a similar arrangement of rollers and parts to be rewound on an exposed film roll 50'.

Supply roll 50 is axially engaged by a pair of knurled bushings 60, 61 which are revolubly mounted in right and left hand side mounting brackets 62, 63, these brackets being, in turn, laterally positionable under the confining influence of gibs 64, 65 bearing against plate 37 to accommodate film rolls of different lengths. A drive spindle 66 having an elongated keyway extends centrally through roll 50 and engages either or both of the bushings 60, 61 by feather keying and is further journalled in aligned anti-friction bearings 67, 68 fixed to side plates 69, 70, the latter of which are mounted on the large supporting plate 37. Gear reduction motor 75 at the right hand side of plate 70 turns spindle 66 through a clutch assembly 74, to be further described. Bushings 60, 61 may either or both be spring biased in the retaining brackets 62, 63 in order that they will firmly secure roll 50 yet may be laterally withdrawn to disconnect the roll therefrom. On the end of spindle 66 opposite that end engaged by clutch 74 is a small knurled hand wheel 76 whereby the spindle may be turned by hand for threading film or withdrawn to the extreme left for removal and insertion of film roll 50.

Brackets 62 and 63, see Figure 4, are locked in place when positioned for the desired film size by small clamping screws 77 which extend therethrough and engage the outside surface of the upper gib 64. Inasmuch as film sizes are usually standard, gib 64 may have a series of spaced, horizontally aligned indentations or notches in which the ends of screws 77 may locate for holding these brackets in an exact position with the film roll 50 centralized with respect to the entire assembly 25. A web follower drive, the purposes of which will be later understood, is provided for by slidably keying a pair of rubber surfaced rollers 78 on a shaft 79, the rollers being in contact with the edges of the film web leaving roll 50 as it passes over the elongated guide roller 51. Shaft 79 is trunnioned at side plates 69 and 70, and rollers 78 are laterally positioned according to the film width by interconnection with the opposed retainer fingers 80 depending from brackets 62 and 63 and engaging the hubs of the rollers. The contact pressure of rollers 78 with the elongated guide roller 51 is made adjustable by trunnioning lower guide roller 51 loosely in side frames 69, 70 and by superimposing thereabove a pair of pressure rollers 81, the latter of which are trunnioned in yokes 82 which are spring biased upwardly in brackets 62, 63 with their downward position made adjustable by a pair of small adjusting screws 83.

On shaft 79, to the left of side frame 69, is a spur gear 85 which engages a smaller spur gear 86 to drive a counter 87 calibrated for linear measurement. Thus, as the web is drawn from roller 50 in contact with the rollers 78, shaft 79 will turn and, in turning, will relay an indication of film travel to the counter. At the right hand side of side frame 70, a train of three spur gears including a driving gear 88, idler gear 89, and driven gear 90, interconnects shaft 79 with a Selsyn motor 92 rigidly fixed to plate 37.

The lower film roll mechanisms to which film feeds, associated with the exposed film reel 50', are substantially identical with the upper mechanisms for the supply roll 50, and like numerals are used to identify like parts in both instances. When driving the web from roll 50 to roll 50' the lower motor 75 will be suitably connected through lower clutch 74 to turn lower shaft 66 and to draw the web thereto, while the upper motor 75 will be disconnected. During operation lower motor 75 will provide stepped, intermittent driving to bring the unexposed portions of the web to the exposure area. If it is desired to reverse the travel of the film web and to rewind, then the lower motor 75 will be disconnected and reverse driving will be accomplished by the upper motor 75.

The sheet metal enclosure covers 35 and 36 which are provided to light-seal the film web and roller mechanisms are hinged as by use of elongated hinge members 95, see Figure 4, fastened to the rectangular supporting plate 37. In closed position these covers rest against fixed horizontal closure plates 96 fitted between side plate 69, 70, and a pair of spring latches 97, Figure 7, arranged at the ends of the enclosure covers serve to retain them in closed position for operation. Supplementing each of the fixed closure members 96 is a pair of horizontal bars 98, 98' to which is secured a thin plate 99, all of the above closure parts extending between side plates 69 and 70 and further serving to exclude light from the film web housings.

Referring to Figure 3, for a description of the vacuum film holder parts, a pair of vertically drawn masks 100 constructed of rubberized fabric or other flexible light-proof material, wound on spring biased rollers, of the type employed for shades or the like, are combined with a pair of horizontally drawn masks 101 to outline a suitable open rectangular area A of unexposed film facing the camera lens. Clamps 102 at the top of the assembly are used to secure the horizontally moveable masks to bar 103 at the top ends of their metal reinforcing borders, the lower ends of the metal borders being provided with hooks which engage over the lower horizontal retainer bar 103'. The vertically drawn masks 100, like horizontal masks 101, have metal reinforcing borders, the ends of which are supplied with a series of fixed pins insertable in the small pin holes 105 uniformly spaced along the vertical support bars 106. Access to the masked face of the vacuum camera back may be had by hinging the plate 37 and its attached parts downward, as shown in the broken lines of Figure 7, with a pair of spring biased flat metal tapes 107 withdrawn from their fixed housings 108 serving to counterbalance the weight of the assembly. Interconnection of the metal tapes 107 with the plate 37 is effected by the use of flexible metal chains 109 provided on one end with locking buckles and made fast to the plate 37 by connection to extension posts 110. The limit of hinging movement to a horizontal position is regulated by the folding cross braces 111, and right and left latches 112, Figure 2, operable by right and left latch handles 113, 113' serve to lock the assembly in its upward position and to permit hinging movement.

Vacuum for sustaining the film web flat against the film platen 55 is obtained from the auxiliary motor driven vacuum pump unit hereinbefore referred to and is directed to the vacuum platen through a vacuum pipe line 115 which extends through the side plate 70 into a regulating manifold 116. A series of valve openings in the manifold operated by needle screws 117 serve to convey vacuum to prescribed areas in the vacuum platen through the vacuum holes 118, Figure 3. By combining a series of circular shape channels 119, Figure 4, to which vacuum is applied, located in one face of plate 37, in alinement and communication with openings from needle screws 117, with a series of rectangular channels 120 in the opposed face of vacuum platen member 55, the latter channels being drilled as at 118 aforementioned, vacuum may be selectively applied to a series of rectangular areas on the surface of member 55. The central clamping cam 121, Figure 2, which is arranged in pressure guide 122 fastened to support 37, is employed to press member 55 in close vacuum sealing contact with member 37 thereby directing the vacuum in the channels above described.

An auxiliary path of travel for the film web is provided around rollers 125, 126, as shown in the broken lines of Figure 4, after the web leaves the supply roll 50 in order to permit film cut-off by a sliding knife blade attachment B, Figures 2 and 7. Cam actuated clamps 127, to which rolls 125, 126 are attached, may be positioned to move these rollers downwardly against plate 96 thus locking the film during a cutting operation. Like provision is made in the lower section before the film winds on rewind reel. If film is cut at the top and bottom to remove a section without disturbing the rolls, rethreading may be resorted to either by running a leader from the lower roll assembly to the upper roll assembly or, in the opposite direction, from the upper to the lower, whereafter a suitable cemented joint may be made for continuing with roll film operation.

The clutch mechanisms 74 of Figure 2 are actuated electrically from solenoid devices 130 through suitable linkages and electrical control, Referring to Figures 2a and 2b for a description of the details of mechanical construction of one of the clutch mechanisms, drive from the source of power, which in this case is a motor 75, extends to spur gear 131, to which an inner driving ring 132 is directly fastened, ring 132 being revolubly retained in the clutch shell 133 by the retainer plate 134. Fixed between gear 131 and ring 132 is a flanged and hollow hub member 135, to which is slidably keyed a clutch driving disc 136. A coil compression spring 137 fitted between hub member 135 and driving disc 136 tends to separate these parts and latch 138 pivoted in hub 135 serves to hold the parts together against this spring pressure by engaging the inner surface of this disc. Tripping of the latch may be accomplished by moving its cylindrical projecting end counterclockwise, Figure 2a, against the pressure of the flat retainer spring 139.

Clutch driving disc 136 is supplied with a pair of oppositely disposed lugs which, when moved to the left at unlatching, will engage corresponding flat faces of the two cam shoes 140 in the driving direction or will ride up the inclined surfaces of the shoes if the driving force originates in the reverse relative direction from shell 133 to which shoes 140 are attached. If the latter condition takes place, then the disc will be automatically re-latched when it has reached its extreme right position abutting ring 132. Shell 133 is rigidly secured to bushing 141 to interconnect the clutch through driving pin 142 with a suitable slot in spindle 66.

Thus, when it is desired to drive the upper spindle to reverse film travel, Figure 2, the corresponding solenoid 130 will be energized to trip the clutch whereafter drive from upper gear 131 to the spindle will take place during 180° of gear rotation. If the lower clutch 74 is in tripped position, it will automatically become reset as its spindle turns. Similar action will take place when it becomes again necessary to operate the mechanisms in the normal operating direction.

Referring to Figures 8 and 9 and 10 for a description of the remote control apparatus 26, a sheet metal enclosure 150 suitably constructed for pedestal mounting serves to house and support the apparatus included therein, and for purposes of clarity the drawings show only the important mechanical and electrical devices included therewith. The electrical switching devices and other incidental apparatus will be understood at a later point during a consideration of the description of the wiring and control diagram.

Paper web 39 traverses the central portion of the front face of enclosure 150 between graduated scales 153 from guide roller 151 trunnioned in the upper back portion of the enclosure through a slotted aperture near the top thereof to a like aperture and guide roller 152 in the lower back portion. The zero reading on scales 153 is located at the mid-point of the scales with linear calibrations in both directions therefrom. Just outside of scales 153 are a pair of rack members 154, and carried thereon are two adjustably fixed control members 155 and 156 for film length and centering respectively. Switch operating signals such as punched holes 157 in the paper web serve to make and break switch contacts controlling electrical connections during the traverse of the web past the bridge control members 155 and 156, as will be later understood.

The paper web supply is removably confined as a roll on the upper spindle 158, Figure 9, which is trunnioned in a pair of small side brackets 159 and 160 fixed to the rear face of enclosure 150, with knob handle 161 for manipulating the spindle secured to an end thereof beyond the right hand side wall of the enclosure. Drive for the web originates in the two Selsyn motors 162 mounted within the enclosure, each drive being carried through series of spur gears 163, 164, 165 to drive shaft 166 also trunnioned in brackets 159, 160 on which are fixed a pair of friction rollers 167 which engage the looped web as it passes over a guide roller thereunder. By design of the Selsyn drive, the surface speed of friction rollers 167 is identical with that of friction rollers 78 in the vacuum back assembly previously described so that paper web 39 will move equal distances and in the same direction simultaneously with the film web. From the friction rollers in the upper section web 39 travels upwardly and past a solenoid actuated means 168 to provide a switch actuating signal. In the illustrated embodiment, the means 168 is a punching device from which the film passes over a flat guide 169 and thence reaches the upper guide roller 151. A pair of counters 175 within the enclosure 150 are directly geared through spur gears 176, 177 to shaft 166 in order to provide a linear reading of the travel of web 39 visible through suitable apertures in the front face of enclosure 150, and reset handles 178 projecting to the left hand side of the enclosure permit zero settings to be made in a convenient manner.

The bridging control members 155 and 156 are essentially alike in construction, each control member serving to maintain a prescribed electrical circuit open during traverse of the tape web thereby and to close that circuit when a switch operating signal, such as a punched hole 157, in the web reaches the control. Referring to Figures 11, 12 and 13, with particular reference to Figure 13, the insulating body portion 180 of each control member spans the racks 154 and is guided against a pair of inverted T shape electrically insulating bar members 181 supporting racks 154, the guiding action being supplemented by the confining influence of inverted L-shaped insulating guide posts 182 which hook over the T-shaped bars. A pair of small spur pinion gears 183 on shaft 184 trunnioned across body portion 180 permit positioning of the controls with respect to the racks and a knurled handle 185 serves for adjustment thereof. Screw 186, Figure 12, threadedly engages body 180 and is provided with a tapered end which may be projected to fit between the rack teeth to lock the assembly in position.

Centrally of each control member is a signal sensing means comprising a spring biased plunger 187, see also Figure 11, suitably confined in an enlarged boss 188 and provided with a double yoked end 189 carrying a pair of rotatable electrical contacts 190 which project against an elongated conducting plate 191 over which web 39 passes, plate 191 being suitably fixed to L-shaped pieces 182. Sliding electrical connection is made between this plate and a narrow conducting strip 192 secured to an under face of the left hand T bar 181 by means of a sliding terminal T. From the rotatable contacts 190, a like connection is made, by the use of a strip connector 193 which extends from boss 188 to the left along the contour of body 180 terminating in a second terminal T which engages with a second conducting strip 194 on the outside under face of T bar 181. Thus, when the paper web 39 is interposed between conducting rollers 190 and plate 191 as shown in Figure 13, a circuit through the control from one conducting strip 192 to the other conducting strip 194 is open. In the absence of the paper web 39, or if a punched opening in the web permits rollers 190 to contact plate 191, then the circuit between strips 192 and 194 will be closed.

Strips 192 and 194 extend for the entire length of T bar 181 and they are suitably directed through the face of the control panel to provide switching at the rear, as will be later understood. Similar provisions are made in the second control member, with a corresponding arrangement of the electrical conducting parts to open and close the electrical circuits between conducting strips 192' and 194' mounted on the right hand insulating T bar 181.

The electrical diagram of Figure 14, taken with the several views, is explanatory of the wiring and controls assembled with the apparatus of my invention, some details of which have been omitted from the other views for the sake of clarity. The upper portion of the diagram outlined in broken lines represents the remote control panel and the lower portion of the diagram indicates other electrical apparatus, included in the camera assembly and used auxiliary thereto.

A grounded male receptacle 200 is employed to plug into a convenient source of supply current which is directed to the main line switch 201. When closed, switch 201 leads current to a double throw switch 202 and, when using roll film, as will be first explained, the arms of this switch will be moved downward to supply current at the lower set of contacts. When using sheet film, double throw selective switch 202 will be positioned to feed current to the upper set of contacts. Certain settings are otherwise made, precedent to operation, including the closing of switches 203 and 204 for turning on the green and red lamps 210, 211, respectively and the adjusted mechanical setting of punch control 155 and centering control 156 for the length of film and film centering position to be used during exposure.

By momentarily closing the starting switch 205, latching relay 206 and main relay 207 will be closed, the hold-in coil of the latching relay serving to hold the main relay for one complete cycle of operation. Main relay 207 will open the normally closed circuit to the green lamp 210, thus turning this lamp off, and at the same time will complete a circuit to the motor 208 driving the vacuum pump. Main relay 207 additionally completes a circuit to operate delay relay 212 and still further establishes circuits to one side of other apparatus to be described including the top film position contact 190 on the punch control member 155 which is normally held open by the web of paper 39 in the remote control unit. This contact is designated 214 in the schematic diagram of the wiring circuit, see Fig. 14.

Delay relay 212 is set to close its two contacts approximately five seconds after being energized, thus permitting vacuum to build up to hold film flat in the roll film unit and then completes two circuits, one of the circuits being current supply to the interval timer relay 219 and the other to the electrical device 216 for opening the camera shutter 28 and holding it open for a prescribed period of time depending upon the timer setting. When timer 219 runs out, it will trip and open the shutter circuit permitting the shutter to close, and at the same time it will actuate relay 217, thus cutting out the vacuum pump motor 208 and starting motor 75 for driving the roll film mechanism in the upper or lower sections of the roll film camera back. Furthermore, the actuation of relay 217 will put relay 218 into the circuit.

By electrical interconnection of the Selsyn motors 92 with Selsyn motors 162 and, by reason of the fact that as motors 75 are started the electrical connection is also completed to the Selsyn motors, any travel of film will result in a corresponding movement of both pairs of Selsyn motors. This movement will continue until a punched hole in paper web 39 closes contact 214 completing the circuit to relay 218 stopping the motor drive and effecting a holding circuit for this relay. Actuation of relay 218 further starts delay relay 213 by completing a circuit to this device.

Delay relay 213 is set for approximately three seconds to permit film and paper to come to a complete standstill prior to a punching operation, then puts the adjustable centering control contact on the bridging control member 156, and which is designated 220 in the schematic diagram of the wiring, into the circuit together with its red light indicator 225, actuates electrical exposure counter 221, actuates paper punch 168 and film nicking punch 49, and starts delay relay 223. Delay relay 223 is set to break after one second thus cutting out the punches 168, 49, and the exposure counter 221, after which it makes a circuit in three seconds to the main motor drive, thus permitting the paper punch to be withdrawn completely before subsequent travel of the film and paper webs. Thereafter, the web movement will continue until the punched hole comes under centering control 220 to close the contacts at this point and to actuate the kick-out coil of latching relay 206 which breaks the circuit to the main relay 207, stopping the motor drive and returning all components to a neutral position with the green light turned on. Re-set switch 226 may be employed to energize the latching circuit of latching relay 206 if failure of the green light 210 to operate indicates an incorrect setting when starting switch 205 is closed. Switch 48, in the circuit of the red lamp 211 is opened by the film web passing thereby and will indicate depletion of the film roll.

Main relay 215 may be used for manual operation when using sheet film and is put into the circuit when selector switch 202 is closed to the upper set of contacts. By momentarily closing switch 227, circuits will be effected whereby, with the use of a pair of foot switches 228 plugged into receptacles 229, 230, a semi-automatic control may be had which will utilize the time delay circuits, above described, for initiating the action of the vacuum pump and controlling the shutter operation.

For roll film operation with automatic repeat, the roll film back and the remote control apparatus are loaded with film and paper threaded from the supply to the rewind on the respective apparata. To conserve film, a suitable lacing strip may be used ahead of the film for a desired distance. As indicated in a description of wiring, switch 202 on the remote control panel 26 will select roll film operation, switches 203 and 204 for the green and red lamps will be turned on, and power switch 201 will be on.

Punch control 214 on the top bridging control member 155 will then be set for the required length of film. This operation is performed by loosening set screw 186 and regulating the control position according to the right hand scale 153' and then re-locking in position with set screw 186. The distance on the scale to which the control is set will be a measure from the punch 168 up and over roller 151 then down over the face of the remote control to the contact point 214. A slight over-allowance should be made for the desired space between each exposure.

Following the setting of control member 155, the operator will set the lower bridging control member 156 for centering film in like manner. In performing this operation the contact point 220 is set to a linear measurement below the zero on the left hand scale, the distance corresponding to half the length of the film with allowance for spacing between exposures. In preparing for centering it is assumed that the vertically drawn masks 100 in the vacuum camera back 25 have likewise been centrally set for the film length according to the settings on the remote control.

With unexposed film just protruding from the top of aperture 24 in the vacuum camera back, the manual punch switch 231 will be closed momentarily, to give a punched hole in web 39 in a nick in the side of the film. This hole and nick will indicate the beginning of the film used for exposure. With the timer 219 set for zero, the automatic cycle control switch 205 will be actuated and the equipment will proceed through one complete cycle of operation at the end of which the green light will appear and the desired length of unexposed film will be centered on the vacuum board ready for exposure. The interval timer is then set for the desired exposure timing and the equipment is ready for duplicating size and exposure by actuating switch 205 each time the green light re-appears.

I claim:

1. In a copying camera having a vacuum pump accessory therewith, in combination, a motor driven web film support mechanism whereby roll film may be progressively threaded from a supply roll along a vacuum platen to a rewind roll, a controller remotely situated with respect to the web film support mechanism but electrically connected therewith including tape responsive electrical switching means to start and stop the motor driven web film support mechanism, to hold the web film stationary during an exposure period, and to operate a vacuum pump during the exposure period of time when the film is stationary, a tape support mechanism in the controller for advancing an indicating and switching control tape across the face thereof, and electrical driving means controlled by movement of a film web in the web film support mechanism to advance an indicating and switching control tape in the tape mechanism in accordance with the movement of film in the film support mechanism.

2. In a copying camera having an electrical shutter accessory therewith, in combination, a motor driven web film support mechanism whereby roll film may be progressively threaded from a supply roll along a vacuum platen to a rewind roll, a controller remotely situated with respect to the web film support mechanism but electrically connected therewith including tape responsive electrical switching means to start and stop the motor driven web film support mechanism, to hold the web film stationary during an exposure period, and to operate an electrical shutter during the exposure period of time when the film is stationary, a tape support mechanism in the controller for advancing an indicating and switching control tape across the face thereof, and electrical driving means controlled by movement of a film web in the web film support mechanism to advance an indicating and switching control tape in the tape mechanism in accordance with the movement of film in the film support mechanism.

3. In a copying camera which includes an electrically driven vacuum pump and an electrically operated shutter accessory therewith, in combination, a motor driven web film support mechanism whereby roll film may be progressively threaded from a supply roll along a vacuum platen to a rewind roll, a controller remotely situated with respect to the web film support mechanism but electrically connected therewith including tape responsive electrical switching means to start and stop the motor driven web film support mechanism, to hold the web film stationary during an exposure period, and to operate a vacuum pump and a camera shutter during the exposure period, a tape support mechanism in the controller for advancing an indicating and switching control tape across the face thereof, and electrical driving means controlled by movement of the film web in the web film support mechanism to advance an indicating and switching control tape in the tape mechanism in accordance with the movement of film in the film support mechanism.

4. In a copying camera which includes an electrically driven vacuum pump and an electrically operated shutter accessory therewith, in combination, a motor driven web film support mechanism whereby roll film may be progressively threaded from a supply roll along a vacuum platen to a rewind roll, a controller remotely situated with respect to the web film support mechanism but electrically connected therewith including tape responsive electrical switching means to start and stop the motor driven web film support mechanism, to hold the web film mechanism stationary during an exposure period, to operate a vacuum pump, and to electrically actuate a camera shutter following the operation of the vacuum pump, a tape support mechanism in the controller for advancing an indicating and switching control tape across the face thereof, and electrical driving means controlled by movement of the film web in the web film support mechanism to advance an indicating and switching control tape in the tape supporting mechanism in accordance with the movement of film in the film support mechanism.

5. In a copying camera, in combination, a web film support mechanism whereby roll film may be progressively threaded from a supply roll through an exposure position and to a rewind roll, a motor drive for said web film support mechanism, a controller remotely situated with respect to the web film support mechanism but electrically connected therewith including electrical switching means to start and stop said motor drive, an indicating tape support mechanism coupled with the controller for moving an indicating tape across the face thereof, and electrical driving means for advancing a tape in said last mentioned support mechanism in accordance with the movement of film in the film support mechanism, said electrical switching means to start and stop the motor drive being responsive to punched holes in an indicating tape in said tape support mechanism.

6. In a copying camera, in combination, a web film support mechanism whereby roll film may be progressively threaded from a supply roll through an exposure position and to a rewind roll, a motor drive for said web film support mechanism, a controller remotely situated with respect to the web film support mechanism but electrically connected therewith including electrical switching means to start and stop said motor drive, an indicating tape support mechanism coupled with the controller for moving an indicating tape across the face thereof, and electrical driving means for advancing a tape in said tape supporting mechanism in accordance with the movement of film in the film support mechanism, said switching means being responsive to punched holes in an indicating tape in said tape support for stopping said motor drive to the web film support mechanism for prescribed periods of time.

7. In a copying camera, in combination, a web film support mechanism whereby roll film may be progressively threaded from a supply roll through an exposure position and to a rewind roll, a motor drive for said web film support mechanism, a controller remotely situated with respect to the web film support mechanism but electrically connected therewith including electrical switching means to start and stop said motor drive, an indicating tape support mechanism coupled with the controller for moving an indicating tape across the face thereof, and electrical driving means for advancing a tape in said tape supporting mechanism in accordance with the movement of film in the film support, said switching means being responsive to punched holes in the indicating tape for stopping the motor drive to the web film support mechanism for prescribed periods of time, one of said periods of time being of sufficient duration to permit film exposure.

8. In a copying camera, in combination, a web film support mechanism whereby roll film may be progressively threaded from a supply roll through an exposure position and to a rewind roll, a motor drive for said web film support mechanism, a controller remotely situated with respect to the web film support mechanism but electrically connected therewith including electrical switching means to start and stop said motor drive, an indicating tape support mechanism coupled with the controller for moving an indicating tape across the face thereof, electrical driving means for moving the tape supporting means in accordance with movement of film in the film support mechanism and for holding the tape stationary during periods when the film is stationary, the switching means for the motor drive being responsive to the presence or absence of indicating tape in said tape support, and punching means in said controller to punch holes in an indicating tape during periods when the tape supporting mechanism is stationary.

9. In a copying camera, means including an electric motor for supporting and moving roll film to and from an exposure position, and controller means for indicating and governing the movement of said film at a station remote from said camera, the said controller means comprising operator actuated electrical switch means for effecting energization of said motor, an indicating and electrical switch controlling tape, means including an electrical motor for supporting and moving said tape, means operatively interconnecting said motors for simultaneous actuation so that said tape is moved in timed relationship with the movement of the film, means for sensing a switch operating signal on said tape, electrical switch means operatively connected with the signal sensing means and the first-mentioned motor for stopping the latter and the second-mentioned motor when a signal on said tape is sensed, and means for producing a switch operating signal on said tape a predetermined distance in advance of the signal sensing means whereby successive equal length portions of said film are sequentially positioned for exposure by actuation of said operator actuated switch means.

10. The combination as defined in claim 9 and further comprising means for altering the position of said tape signal sensing means relative to said signal-producing means to thereby alter the length of the film portions successively positioned for exposure.

11. The combination as defined in claim 9 and further comprising a time delay means operated by the said switch means responsive to sensing of a signal on said tape, and operative connections from said time delay means to said signal producing means for actuating the latter a predetermined time after a signal on said tape is sensed.

12. The combination as defined in claim 9 and wherein the said camera includes a vacuum platen adjacent which the film is disposed when positioned for effecting an exposure thereon, electrically operated means for creating a vacuum between said platen and film, switch means controlled by said operator actuated means for effecting energization of said electrically operated means, and time delay means actuated by said operator actuated switch means and effective a predetermined time thereafter to deenergize said vacuum producing means and to energize the first-mentioned motor.

13. In a copy camera provided with a shutter, means including an electric motor for supporting and moving film to and from an exposure position, and controller means for indicating and governing the movement of said film at a station remote from said camera, the said controller means comprising an indicating and electrical switch controlling tape, means including an electric motor for supporting and moving said indicating tape, means operatively interconnecting said motors for simultaneous operation so that the said tape is moved in timed relationship with the movement of said film, shutter operating means, operator actuated electrical switch means, timing means controlled by said operator actuated switch means and connected with said shutter operating means and said first-mentioned motor for effecting sequential operation thereof, means for sensing a switch operating signal on said tape, electrical switch means actuated by said signal sensing means and operatively connected with the first-mentioned motor for stopping the latter thereby stopping said film and tape, means for producing a switch operating signal on said tape a predetermined distance in advance of the signal sensing means, and means operated by the last-mentioned switch means for operating the signal producing means, whereby successive equal length portions of said film are sequentially positioned and exposed by operation of said operator actuated switch means.

WILLIAM C. HUEBNER.

REFERENCES CITED

The following references are of record in the file of this patent:

UNITED STATES PATENTS

| Number | Name | Date |
| --- | --- | --- |
| 1,676,600 | Capstaff | July 10, 1928 |
| 1,847,531 | Kesses | Mar. 1, 1932 |
| 2,307,646 | Sonne | Jan. 5, 1943 |
| 2,312,887 | Ericksson | Mar. 2, 1943 |